US009850692B2

(12) United States Patent
Kim

(10) Patent No.: US 9,850,692 B2
(45) Date of Patent: Dec. 26, 2017

(54) GLOVE BOX FOR AN AUTOMOBILE

(71) Applicant: HYUNDAI MOBIS Co., Ltd., Yongin-si, Gyeonggi-do (KR)

(72) Inventor: Myoung Seok Kim, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 403 days.

(21) Appl. No.: 14/538,929

(22) Filed: Nov. 12, 2014

(65) Prior Publication Data

US 2015/0130193 A1    May 14, 2015

(30) Foreign Application Priority Data

Nov. 12, 2013  (KR) .......................... 10-2013-0137190

(51) Int. Cl.
| | |
|---|---|
| *E05C 9/10* | (2006.01) |
| *E05B 83/30* | (2014.01) |
| *B60R 7/06* | (2006.01) |
| *E05C 9/04* | (2006.01) |
| *E05C 9/12* | (2006.01) |

(52) U.S. Cl.
CPC ................ *E05B 83/30* (2013.01); *B60R 7/06* (2013.01); *E05C 9/041* (2013.01); *Y10T 292/0834* (2015.04)

(58) Field of Classification Search
CPC ............. Y10T 292/08; Y10T 292/0801; Y10T 292/0834; Y10T 292/0836; Y10T 292/0837; Y10T 292/0838; Y10T 292/0839; Y10T 292/0843; Y10T 292/0844; Y10T 292/0845; E05B 83/22; E05B 83/28; E05B 83/30; E05B 83/32; E05C 9/00; E05C 9/002; E05C 9/008; E05C 9/04; E05C 9/041; E05C 9/10; E05C 9/12; E05C 9/20; E05C 9/22; Y10S 292/11; Y10S 292/37; Y10S 292/64; B60R 7/06
USPC .......................... 296/37.12, 24.34, 37.8, 37.1
See application file for complete search history.

(56) References Cited

U.S. PATENT DOCUMENTS

| | | | | |
|---|---|---|---|---|
| 1,729,784 | A | * 10/1929 | Kemp | ..................... E05C 9/045 |
| | | | | 292/33 |
| 2004/0256859 | A1 | 12/2004 | Yamada | |
| 2011/0309640 | A1 * | 12/2011 | Matsubara | ............ E05B 63/248 |
| | | | | 292/159 |

FOREIGN PATENT DOCUMENTS

| | | | |
|---|---|---|---|
| DE | 10 2004 018 811 A1 | 11/2004 | |
| DE | 102009012710 A1 * | 9/2010 | ............. E05B 83/30 |
| DE | 102012101117 A1 * | 8/2013 | ............. E05C 9/041 |
| DE | 202014102186 U1 * | 6/2014 | ............. E05B 83/30 |

(Continued)

OTHER PUBLICATIONS

Computer Generated Translation for DE 10201101117, Generated on Jan. 3, 2017, http://worldwide.espacenet.com.*

(Continued)

*Primary Examiner* — Alyson M Merlino
(74) *Attorney, Agent, or Firm* — Paratus Law Group, PLLC

(57) ABSTRACT

Disclosed is a glove box for an automobile. The glove box for an automobile includes a glove box door which is open/closed; a first lock rod including an end protruding to a side of the glove box door in the glove box door to lock the side of the glove box door; and a second lock rod including an end protruding to an opposite side of the glove box door in the glove box door to lock the opposite side of the glove box door.

15 Claims, 8 Drawing Sheets

(56) References Cited

FOREIGN PATENT DOCUMENTS

| JP | FR 2849089 A1 * | 6/2004 | ............... B60R 7/06 |
| JP | WO 2013099599 A1 * | 7/2013 | ............... B60R 7/06 |
| JP | WO 2013118326 A1 * | 8/2013 | ............... B60R 7/06 |

OTHER PUBLICATIONS

Computer Generated Translation for DE 202014102186, Generated on Jan. 3, 2017, http://worldwide.espacenet.com.*
Feb. 3, 2016, German Office Action for related DE application No. 102014116421.0.

* cited by examiner

GLOVE BOX FOR AN AUTOMOBILE

CROSS REFERENCE TO PRIOR APPLICATIONS

The present application claims priority under 35 U.S.C. §119 to Korean Patent Application No. 10-2013-0137190 (filed on Nov. 12, 2013), which is hereby incorporated by reference in its entirety.

BACKGROUND OF THE INVENTION (a) Technical Field

The present invention relates to a glove box for an automobile, and more particularly, to a glove box for an automobile including two rods for locking both sides of a glove box door disposed in the glove box door.

(b) Background Art

In general, a glove box is disposed in an instrument panel and serves as a box capable of simply receiving products. The glove box is generally disposed forward of a passenger seat.

The glove box includes a glove box housing fixed in the instrument panel and a glove box door coupled in the glove box housing by a hinge and is open/closed by an operation of a user, and receives products in the glove box door. Meanwhile, a locking device for locking the glove box door in the glove box housing and release the locking is disposed at the glove box door.

In the locking device, a rod disposed inside the glove box door protrudes to a lateral side of the glove box door and is inserted into the glove box housing so that the glove box door is locked in the glove box housing.

The locking device includes a pull type locking device for releasing locking by pulling a knob disposed at the glove box door and a push type locking device for releasing the locking by pushing a button. That is, when the user pulls the knob or pushes the button, the rod connected to the knob or the button is separated from the glove box housing so that the locking of the glove box door is released from the glove box housing.

Two rods are provided in the glove box door. One of the two rods locks a right side of the glove box door, and another rod locks a left side of the glove box door so that a locking device having a dual lock structure is installed.

In the locking device having the dual lock structure, when the user does not operate the knob or the button, the two rods protrude an outer side of the glove box door by an elastic force of a spring disposed inside the glove box door.

Accordingly, when the glove box door is closed in a state that the glove box door is open, the two rod protruding to the outer side of the glove box door is pulled by the glove box housing surface and is move into the inside of the glove box door. When the two rods is fitted in a hole formed in the glove box housing, the rods again protrude to an outer side of the glove box door by the elastic force of the spring and are inserted into the hole so that the glove box door is locked in the glove box housing.

In the meantime, both sides of the glove box door may be simultaneously locked or released by assembling the two rods are assembled so that lengths of the two rods protruding in the glove box door are same as each other. However, since there is no part of limiting an assembly position of the two rods, an erroneous assembling occurs while the two rods are installed in the glove box door.

SUMMARY OF THE DISCLOSURE

The present invention has been made in an effort to solve the above-described problems associated with prior art, and provides a glove box for an automobile which may simultaneously lock both sides of a glove box door and simultaneously release locking therein.

Objects of the embodiment may not be limited to the above and other objects and other objects which are not described may be clearly comprehended to those of skill in the art to which the embodiment pertains through the following description.

In accordance with an aspect of the present invention, there is provided a glove box for an automobile, including: a glove box door which is open/closed; a first lock rod including an end protruding to a side of the glove box door in the glove box door to lock the side of the glove box door; and a second lock rod including an end protruding to an opposite side of the glove box door in the glove box door to lock the opposite side of the glove box door, wherein an assembly positioning groove is formed in the first lock rod, an assembly positioning protrusion is formed in the second lock rod, the assembly positioning protrusion is inserted into the assembly positioning groove so that an assembly position of the first lock rod and an assembly position of the second lock rod are determined.

The details of other embodiments are contained in the detailed description and accompanying drawings.

In the glove box for the automobile according to the present invention, since an assembling position of the first lock rod and an assembling position of the second lock rod are determined if an assembly positioning protrusion formed in the first lock rod is inserted into an assembly positioning groove formed in the first lock rod. The first lock rod and the second lock rod are assembled in the glove box door so that protruding lengths of ends of the first lock rod and the second lock rod to both sides of the glove box door are the same as each other, thereby simultaneously locking the both sides of the glove box door or releasing the locking therein.

Further, since the first lock rod and the second lock rod are moved rightward and leftward while being engaged with a geared rotating member, sliding motion displacements of the first lock rod and the second lock rod are the same as each other so that the both sides of the glove box door may be simultaneously located or the locking therein may be released.

The present invention is not limited to the above effects. Those skilled in the art will appreciate other effects which are not described based on the appended claims.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

DETAILED DESCRIPTION

Figure 1:
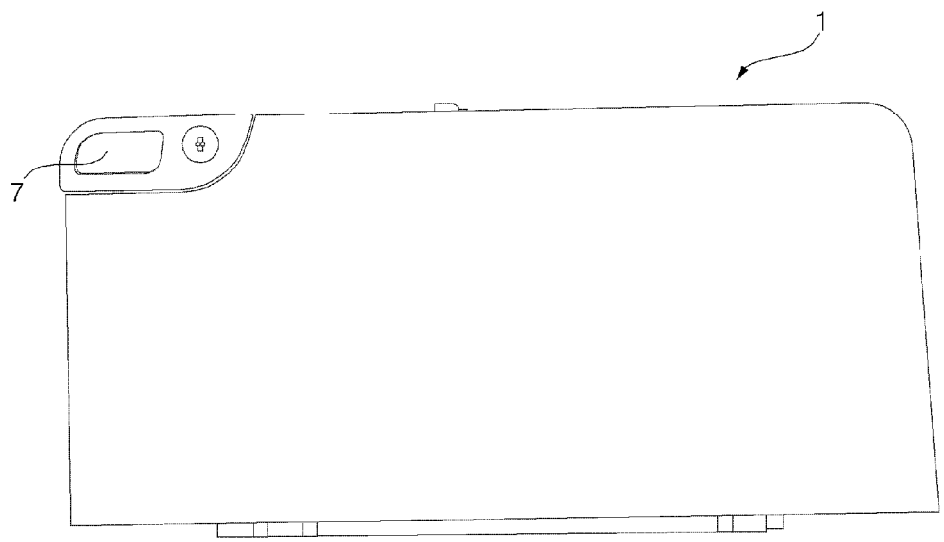
FIG. 1 is a front view illustrating a glove box door of a glove box for an automobile according to an embodiment of the present invention.

Hereinafter, an exemplary embodiment of the present invention will be described more specifically with reference to the accompanying drawings. However, while the present invention has been described with reference to a few specific embodiments, the description is illustrative of the invention and is not to be construed as limiting the invention. In the following description, for the illustrative purpose, the same components will be assigned with the same reference numerals, and the repetition in the description about the same components will be omitted in order to avoid redundancy.

Hereinafter, a glove box for an automobile according to an embodiment of the present invention will be described with reference to the accompanying drawings.

Figure 2:
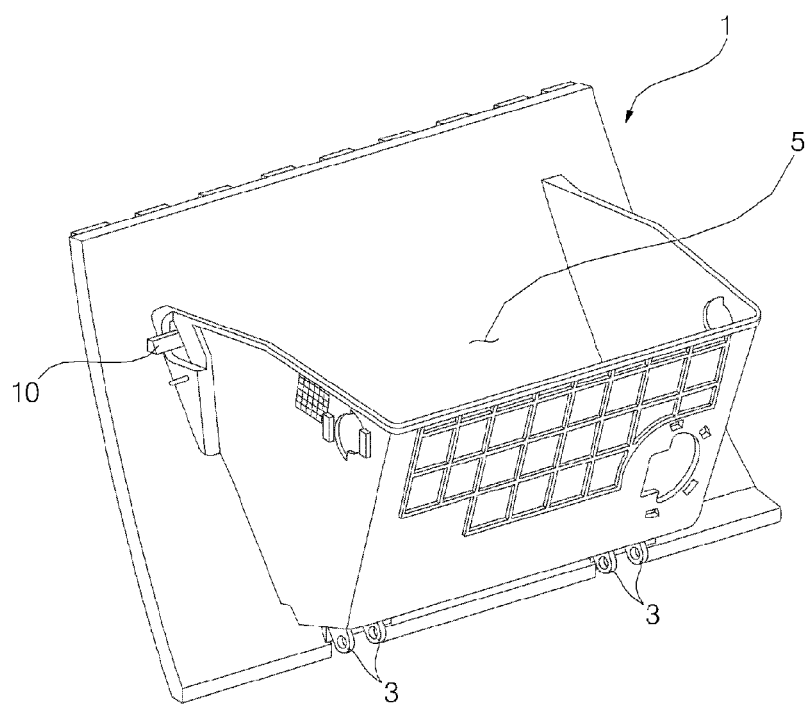
FIG. 2 is a rear perspective view illustrating a glove box door of a glove box for an automobile according to an embodiment of the present invention.
Figure 3:
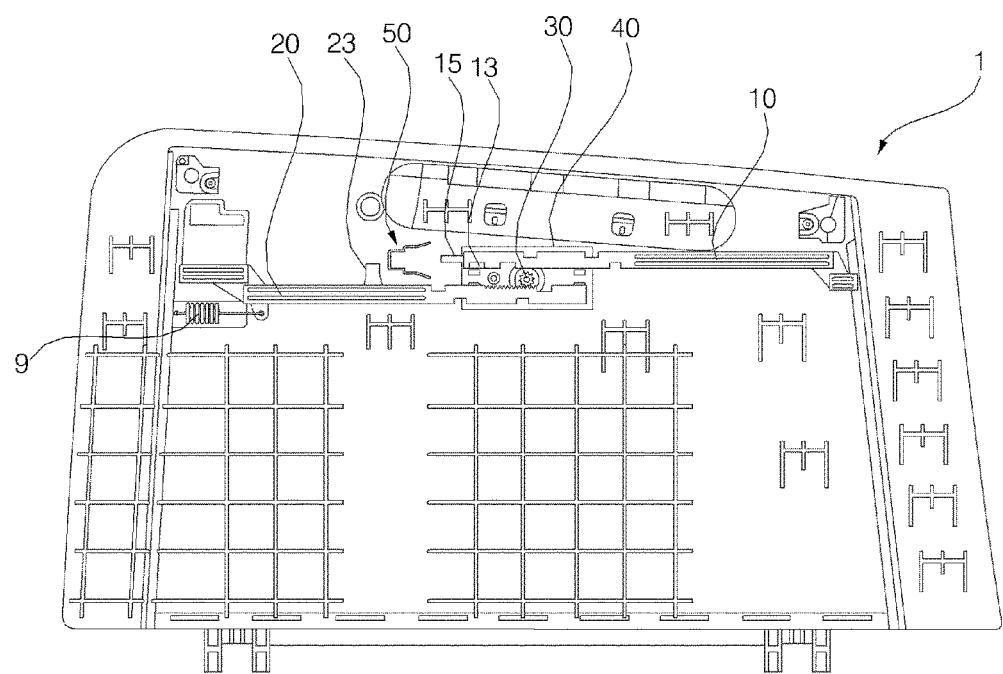
FIG. 3 is a front view illustrating an inside of the glove box, which illustrates positions of a first lock rod and a second lock rod when the glove box door is locked.
Figure 4:
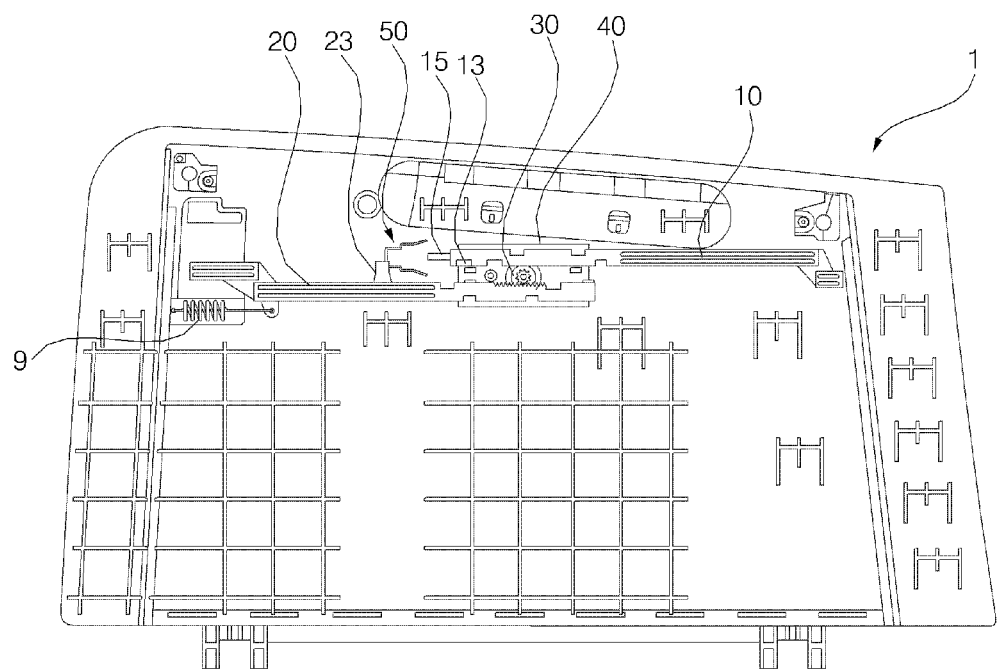
FIG. 4 is a front view illustrating an inside of the glove box, which illustrates positions of a first lock rod and a second lock rod when the glove box door is open.
Figure 5:
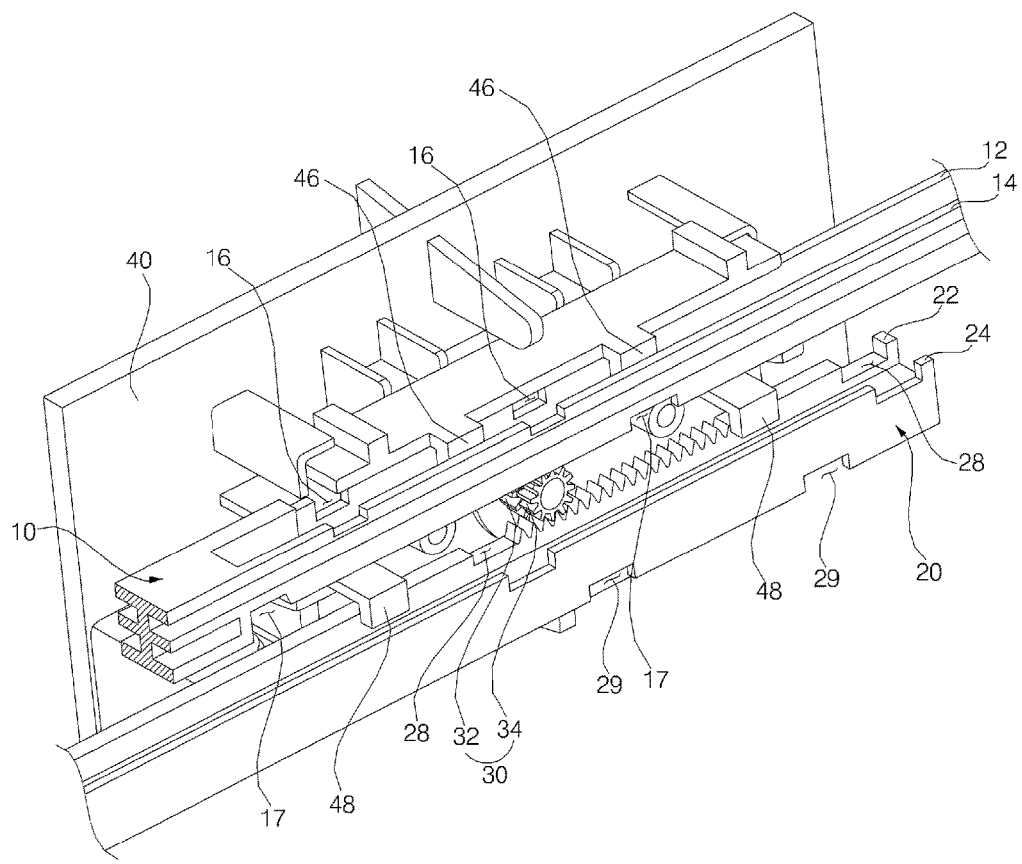
FIG. 5 is a perspective view illustrating a coupling relation between a support plate, a rotating member, a first lock rod, and a second lock rod, which illustrates an open state of the glove box door shown in FIG. 4.

FIG. 1 is a front view illustrating a glove box door of a glove box for an automobile according to an embodiment of the present invention. FIG. 2 is a rear perspective view illustrating a glove box door of a glove box for an automobile according to an embodiment of the present invention. FIG. 3 is a front view illustrating an inside of the glove box, which illustrates positions of a first lock rod and a second lock rod when the glove box door is locked. FIG. 4 is a front view illustrating an inside of the glove box, which illustrates positions of a first lock rod and a second lock rod when the glove box door is open. FIG. 5 is a perspective view illustrating a coupling relation between a support plate, a rotating member, a first lock rod, and a second lock rod, which illustrates an open state of the glove box door shown in FIG. 4.

Referring to FIGS. 1 to 5, the glove box according to an embodiment of the present invention includes a glove box door 1 disposed forward of a passenger seat of the automobile. The glove box door 1 is disposed in an instrument panel inside the automobile to be open/closed to simply receive products.

A hinge coupling part 3 rotatably coupled with a body is formed at a bottom end of the glove box door 1. The glove box door 1 may be rotatably coupled with a glove box housing (not shown) coupled in the instrument panel by inserting a pin (not shown) into a hinge coupling part 3.

Further, a receiving space for simply products in a rear surface thereof is formed in the glove box door 1. When the glove box door 1 is closed, the receiving space 5 is inserted into the glove box housing.

In addition, a button 7 is disposed at a front surface of the glove box door 1 so that the user pushes the button 7 in order to open/close the glove box door 1.

In addition, a first lock rod 10 and a second lock rod 20 for locking the glove box door 1 or releasing the locking of the glove box door 1 are installed inside the glove box door 1. When glove box door 1 is closed, an end of the first lock rod 10 protrudes to a right side of the glove box door 1, and an end of the second lock rod 20 protrudes to a left side of the glove box door 1 so that protruded parts are inserted into the glove box housing and are locked not to open the glove box door 1.

If the user pushes the button 7 in order to open the glove box door 1, ends of the first lock rod 10 and the second lock rod 20 are separated from the glove box housing and enter in the glove box door 1 so that the locking of the globe box door 1 is released.

In more detail, the first lock rod 10 is slidably installed rightward and leftward in the glove box door 1 in the upward direction rather than the second lock rod 20 so that an end of the first lock rod 10 protrudes to a right side of the glove box door 1.

The second lock rod 20 is spaced apart from the first lock rod 10 downward and is slidably installed rightward and leftward in the glove box door 1 so that an end of the second lock rod 20 protrudes to a left side of the glove box door 1. If the user presses and pushes the button 7, the second lock rod 20 is pulled by a pin (not shown) connected to the button 7 and is slid to a right side in the glove box door 1 so that a part protruding to a left side of the glove box door 1 may be inserted into an inside of the glove box door 1.

A spring 9 connected to the second lock rod 20 is further disposed in the glove box door 1. When the user does not press the button 7, the spring 9 pulls the second lock rod 20 so that an end of the second lock rod 20 may protrude to a left side of the glove box door 1.

A rotating member 30 for sliding the first lock rod 10 and the second lock rod 20 in the opposite direction is further provided in the glove box door 1. The rotating member 30 may be rotatably supported by a support plate 40 fixed and coupled in the glove box door 1 and may be rotatably provided in the glove box door 1.

The first lock rod 10 and the second lock rod 20 are supported in the support plate and is slidably provided rightward and leftward.

It is preferable that the rotating member 30 is disposed between the first lock rod 10 and the second lock rod 20 so that the first lock rod 10 and the second lock rod 20 may be slidably moved in the opposite direction.

Gear teeth engaged with the rotating member 30 are formed in the first lock rod 10 and the second lock rod 20, respectively. A gear tooth engaged with the gear teeth formed in the first lock rod 10 and the second lock rod 20 is formed in the rotating member 30. The first lock rod 10, the second lock rod 20, and the rotating member 30 are engaged with each other by a gear coupling of a rack pinion structure.

In FIG. 5, a gear tooth engaged with the rotating member 30 is formed at an upper side of the second lock rod 20 and a gear tooth formed in the first lock rod 10 is not viewed, but a gear tooth is formed at a lower side of the first lock rod 10 which is a position corresponding to the second lock rod 20.

The rotating member 30 is configured by a double gear. That is, the rotating member 30 includes a first gear 32 engaged with the gear tooth formed in the first lock rod 10 and a second gear 34 engaged with the gear tooth formed in the second lock rod 20.

The first gear 32 is engaged with a lower side of the first lock rod 10 and the second gear 34 is engaged with an upper side of the second lock rod 20.

The first gear 32 and the second gear 34 are axially connected to each other. The first gear 32 and the second gear 34 may be coaxially installed to be rotated at the same angle. That is, when the second gear 34 is rotated, the first gear 32 is rotated at the same angle together the second gear 34.

A diameter of the first gear 32 is different from a diameter of the second gear 34. The diameter of the first gear 32 is larger than the diameter of the second gear 34, and the diameter of the second gear 32 is smaller than the diameter of the first gear 32. In the present embodiment, the diameter of the first gear 32 is 6.72 mm and the diameter of the second gear 34 is 5.56 mm. That is, the diameter of the first gear 32 is about 1.2 times larger than the diameter of the second gear 34.

The second lock rod 20 is pulled by the button 7 and is slid leftward in the glove box door 1 so that a part of the second lock rod 20 protruding to a left side of the glove box door 1 is inserted into an inside of the glove box door 1. Accordingly, the second gear 34 is rotated counter-clockwise by the second lock rod 20, and the first gear 32 is simultaneously rotated counter-clockwise together with the second gear 34. Accordingly, the first gear 32 slides the first lock rod 10 leftward in a glove box door 1 being an opposite direction of the second lock rod 20 so that a part of the first lock rod 10 protruding to a left side of the glove box door 1 may be inserted into an inside of the glove box door 1.

The first lock rod 10 may include an inner side portion 12 engaged with the first gear 32 in the rotating member 30 and an outer side portion 14 spaced apart from the inner side portion 12 forward and rearward. The gear tooth formed in the first lock rod 10 is formed at a lower side of the inner side portion 12 to be engaged with the first gear 32. A vertical width of the inner side portion 12 is narrower than that of the outer side portion 14 so that a height of a lower side of the inner side portion 12 formed therein with the gear tooth is higher than that of a lower side of the outer side portion 14.

Further, the second lock rod 20 may include an inner side portion 22 engaged with the second gear 34 in the rotating member 30 and an outer side portion 24 spaced apart from the inner side portion 22 forward and rearward. The gear tooth formed in the second lock rod 20 is formed at an upper side of the inner side portion 22 to be engaged with the second gear 34. A vertical width of the inner side portion 22 is narrower than that of the outer side portion 24 so that a height of a upper side of the inner side portion 22 formed therein with the gear tooth is higher than that of a upper side of the outer side portion 24.

Figure 6:
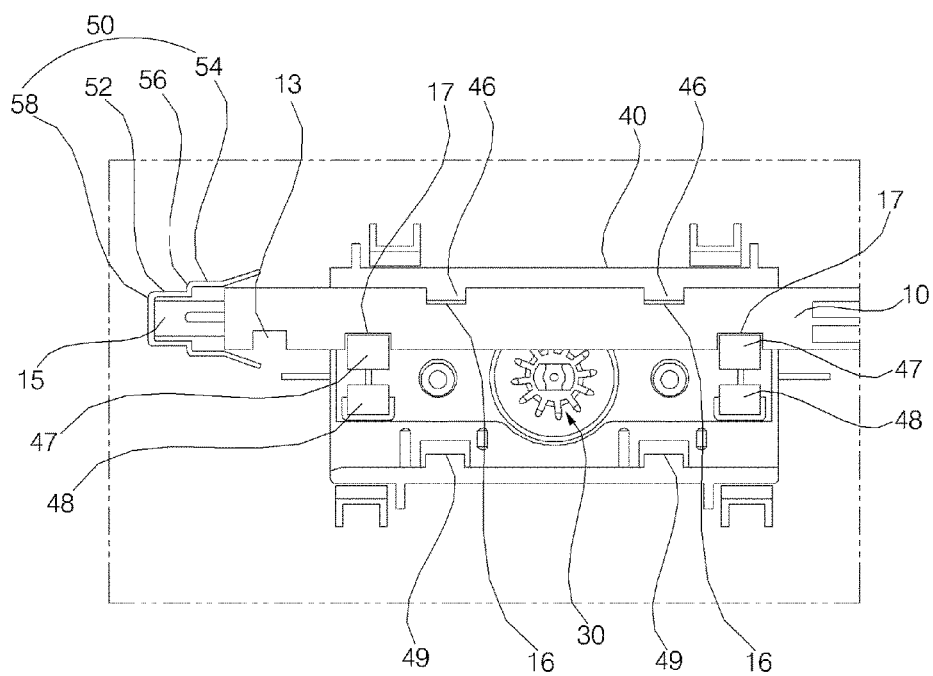
FIG. 6 is a view illustrating an initial state where the first lock rod is installed in the support plate.

Guide parts 46 and 47 are inserted between the inner side portion 12 and the outer side portion 14 of the first lock rod 10 in the support plate 40 to guide a sliding motion of the first lock rod 10. The lower guide part 47 of the guide parts 46 and 47 is not viewed in FIG. 5 but is shown in FIG. 6. The guide parts 46 and 47 are spaced apart from each other rightward and leftward with a plural in number. The guide parts 46 and 47 include an upper guide part 46 inserted into an upper side of the first lock rod 10 and a lower guide part 47 inserted into a lower side of the first lock rod 10.

An upper guide part insertion groove 16 is formed at an upper side of the first lock rod 10 so that the upper guide part 46 is inserted into the upper guide part insertion groove 16. A lower guide part insertion groove 17 is formed at a lower side of the first lock rod 10 so that the lower guide part 47 is inserted into the lower guide part insertion groove 17.

That is, after allowing the upper guide part 46 to be aligned with the upper guide part insertion groove 16 forward and rearward, and allowing the lower guide part 47 to be aligned with the upper guide part insertion groove 17 forward and rearward, the first lock rod 10 is pulled in the support plate 40 and the first lock rod 10 is slid rightward and leftward so that the upper guide part 46 and the lower guide part 47 are provided between the inner side portion 12 and the outer side portion 14.

Accordingly, forward and rearward motion of the first lock rod 10 is limited by the upper guide part 46 and the lower guide part 47 and the first lock rod 10 is not separated from the support plate 40 forward and rearward but may be slid rightward and leftward.

Further, guide parts 48 and 49 are inserted between the inner side portion 22 and the outer side portion 24 of the second lock rod 20 in the support plate 40 to guide a sliding motion of the second lock rod 20. The guide part 49 of the guide parts 48 and 49 is not viewed in FIG. 5 but is shown in FIG. 6. The guide parts 48 and 49 are spaced apart from each other rightward and leftward with a plural in number. The guide parts 48 and 49 include an upper guide part 48 inserted into an upper side of the second lock rod 20 and a lower guide part 49 inserted into a lower side of the second lock rod 20.

An upper guide part insertion groove 28 is formed at an upper side of the second lock rod 20 so that the upper guide part 48 is inserted into the upper guide part insertion groove 28. A lower guide part insertion groove 29 is formed at a lower side of the second lock rod 20 so that the lower guide part 49 is inserted into the lower guide part insertion groove 29.

That is, after allowing the upper guide part 48 to be aligned with the upper guide part insertion groove 28 forward and rearward, and allowing the lower guide part 49 to be aligned with the upper guide part insertion groove 29 forward and rearward, the second lock rod 20 is pulled in the support plate 40 and the second lock rod 20 is slid rightward and leftward so that the upper guide part 48 and the lower guide part 49 are provided between the inner side portion 22 and the outer side portion 24.

Accordingly, forward and rearward motion of the second lock rod 20 is limited by the upper guide part 48 and the lower guide part 49 and the second lock rod 20 is not separated from the support plate 40 forward and rearward but may be slid rightward and leftward.

However, in order the first lock rod 10 and the second lock rod 20 for simultaneously locking both sides of the glove box door 1 and simultaneously releasing the locking therein, the first lock rod 10 and the second lock rod 20 should be aligned at a position which a protruding length of a right end of the first lock rod 10 from the glove box door 1 is equal to a protruding length of a left end of the second lock rod 20 from the glove box door 1.

There may be a need to determine an assembly position of the first lock rod 10 and an assembly position of the second lock rod 20 so that a protruding length of an end of the first lock rod 10 to one side of the glove box door 1 is equal to a protruding length of an end of the second lock rod 20 to an opposite side of the glove box door 1. This will be described with reference to FIGS. 6 to 10.

Figure 7:
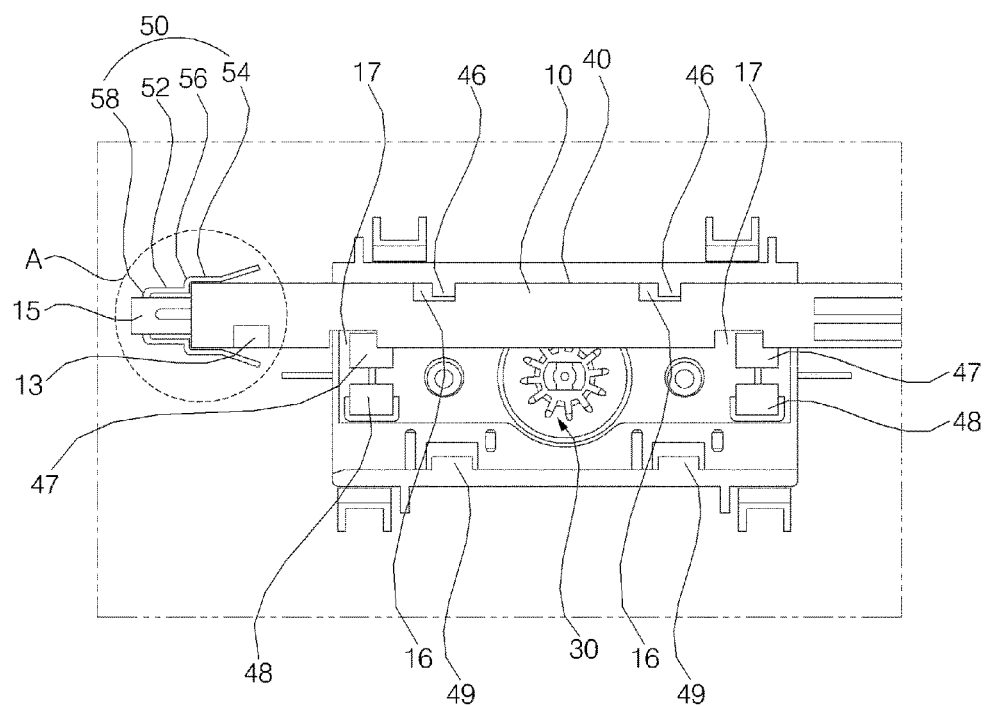
FIG. 7 is a view illustrating a state of the first lock rod moved rightward in order to determine an assembly position of the first lock rod and an assembly position of the second lock rod.
Figure 8:
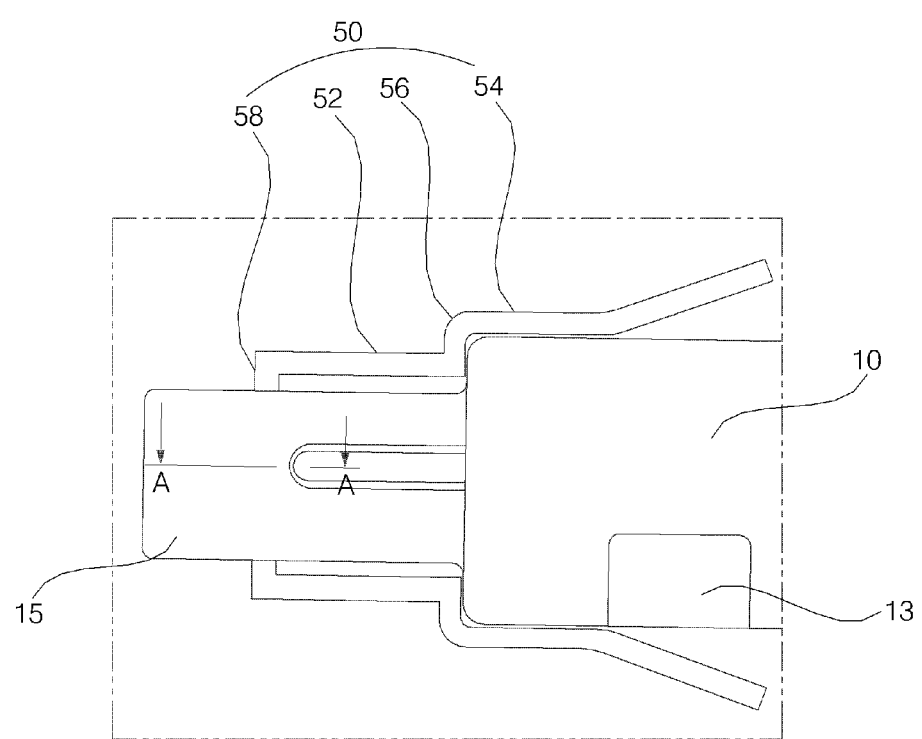
FIG. 8 is an enlarged view of a part A defined by a dotted line shown in FIG. 7.
Figure 9:
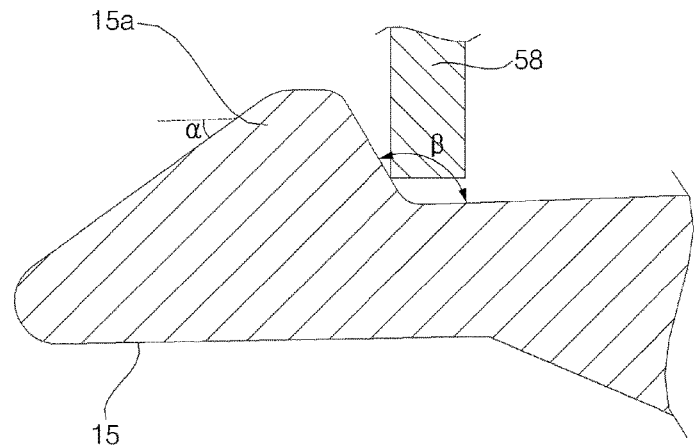
FIG. 9 is a sectional view taken along line A-A of FIG. 8.
Figure 10:
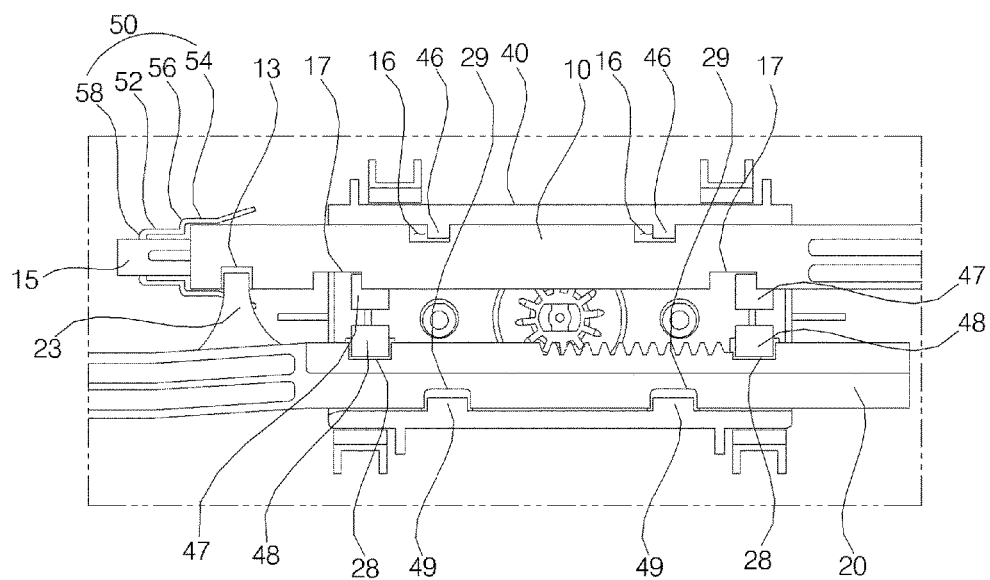
FIG. 10 is a view illustrating determined states of an assembly position of the first lock rod and an assembly position of the second lock rod.

FIG. 6 is a view illustrating an initial state where the first lock rod is installed in the support plate. FIG. 7 is a view illustrating a state of the first lock rod moved rightward in order to determine an assembly position of the first lock rod and an assembly position of the second lock rod. FIG. 8 is an enlarged view of a part A defined by a dotted line shown in FIG. 7. FIG. 9 is a sectional view taken along line A-A of FIG. 8. FIG. 10 is a view illustrating determined states of an assembly position of the first lock rod and an assembly position of the second lock rod.

Referring to FIGS. 6 to 10, an assembly positioning groove 13 is formed at an opposite end of the first lock rod 10. The assembly positioning groove 13 is having a concave shape including an open lower side is formed at a front surface of the first lock rod 10. An assembly positioning protrusion 23 is formed in the second lock rod 20 to be inserted into the assembly positioning groove 13. The assembly positioning protrusion 23 protrudes from a lower side of the second lock rod 20 upward. If the assembly positioning protrusion 23 is inserted into the assembly positioning groove 13, assembly positions of the first locking rod 10 and the second locking rod 20 are determined.

That is, a position of the assembly positioning protrusion 23 inserted in the assembly positioning groove 13 becomes a position where a protruding length of a right end of the first lock rod 10 from the glove box door 1 is equal to a protruding length of a left end of the second lock rod 20 from the glove box door 1.

As described above, in a state that the assembly position of the first lock rod 10 and the assembly position of the second lock rod 20 are determined, the first lock rod 10 and the second lock rod 20 are engaged with the rotating member 30 so that the first lock rod 10 and the second lock rod 20 may be move in the opposite direction.

Accordingly, as shown in FIG. 10, after the assembly position of the first lock rod 10 and the assembly position of the second lock rod 20 are determined by inserting the assembly positioning protrusion 23 into the assembly positioning groove 13, the first lock rod 10 is slid rightward and the second lock rod 20 is slid leftward to be located at positions shown in FIG. 3 so that the first lock rod 10 and the second lock rod 20 are completely assembled in the glove box door 1.

When the first lock rod 10 is slid rightward and the second lock rod 20 is slid leftward after determining the assembly position of the first lock rod 10 and the assembly position of the second lock rod 20, the assembly positioning protrusion 23 may be formed of a thin plate having elastic force and the assembly positioning groove 13 may be formed by slightly recessing a front surface of the second lock rod 20.

A process of assembling the first lock rod 10 and the second lock rod 20 in the glove box door 1 is as follows.

Referring to FIG. 6, after allowing the upper guide part 46 to be aligned with the upper guide part insertion groove 16 and allowing the lower guide part 47 to be aligned with the lower guide part insertion groove 17, if the first lock rod 10 is pulled in the support plate 40, the first locking rod 10 may be slid rightward and leftward.

Next, as shown in FIG. 7, the first lock rod 10 is slid to a left side. A stopper 50 for limiting a motion of the first lock rod 10 when the assembly positioning protrusion 23 is inserted into the assembly positioning groove 13, is formed inside the glove box door 1.

Further, a projection 15 is formed at an opposite end (left end) of the first lock rod 10. The projection 15 has a vertical width narrower than that of the opposite end of the first lock rod 10.

The stopper 50 includes a first insertion portion 52 having a vertical width in which the projection 15 is inserted, a second insertion portion 54 having a vertical width greater than that of the first insertion portion 52 and in which an opposite end of the first lock rod 10 is inserted, a protrusion 56 which vertically connects the first insertion portion 52 to the second insertion portion 54 to limit motion of the first lock rod 10 inserted into the second insertion portion 54, and a locking portion 58 which vertically connects an end of the first insertion portion 52.

Accordingly, if the first locking rod 10 is slid leftward, since the opposite end of the first locking rod 10 is locked in the protrusion 56, the first lock rod 10 is no longer moved to a left side. In this state, the first lock rod 10 is not moved to the left side so that the assembly position of the first lock rod 10 and the assembly position of the second lock rod 20 may be exactly determined.

Referring to FIGS. 8 and 9, in order to prevent the first lock rod 10 from being moved to the left side, a hook protrusion 15a locked in the locking portion when a motion of the first lock rod 10 is limited by the protrusion 56, is formed at a rear surface of the projection 15.

In order to slide the first lock rod 10 to be located as shown in FIG. 3 after the assembly position of the first lock rod 10 and the assembly position of the second lock rod 20 are determined, since the hook protrusion 15a is not completely fixed to the locking portion 58, the hook protrusion 15a has an entry angle (α) of 35 degrees and a back angle (β) of 120 degrees.

After that, as shown in FIG. 10, if the second lock rod 20 is pull and inserted into the support plate 40 after allowing the upper guide part 48 to be aligned with the upper guide portion insertion groove 28 and allowing the lower guide part 49 to be aligned with the lower guide part insertion groove 29, the assembly positioning protrusion 23 is inserted into the assembly positioning groove 13 so that the assembly position of the first lock rod 10 and the assembly position of the second lock rod 20 are determined and the second lock rod 20 may be slid rightward and leftward.

That is, when the assembly positioning protrusion 23 is a position to be inserted into the assembly positioning groove 13, the upper guide part insertion groove 28 formed in the second lock rod 20 is a position to be inserted into the upper guide part 48, and the lower guide part insertion groove 29 formed in the second lock rod 20 is a position to be inserted into the lower guide part 49.

As described above, if the first lock rod 10 is slid rightward and the second lock rod 20 is slid leftward after the assembly position of the first lock rod 10 and the assembly position of the second lock rod 20 are determined, the first lock rod 10 and the second lock rod 20 are simultaneously move by the rotating member 30 to be located as illustrated in FIG. 3. Next, the first lock rod 10 and the second lock rod 20 may be completely assemble in the glove box door 1 by connecting the spring 9 to the second lock rod 20.

An operation of the glove box for an automobile according to an embodiment of the present invention having a construction as described above is as follows.

First, when the glove box door 1 is closed, an end of the first lock rod 10 protrudes to a right side of the glove box door 1 so that the first lock rod 10 is inserted and locked into the glove box housing, and an end of the second lock rod 20 protrudes to a left side of the glove box door 1 so that the second lock rod 20 is inserted and lock into the glove box housing, so that both sides of the glove box door 1 are locked by the first lock rod 10 and the second lock rod 20.

Next, if the button 7 is pressed and pushed in order the user for opening the glove box door, the second lock rod 20 is pulled by the button to be slid in the glove box door 1 so that a protruding part of the second lock rod 20 is inserted into the glove box door 1, thereby releasing the locking of the left side of the glove box door 1.

Since the second lock rod 20 is slid rightward in the glove box door 1 and the second gear 34 is engaged with the second lock rod 20, the second gear 34 is rotated counter-clockwise and the first gear 32 is rotated counter-clockwise together the rotation of the second gear 34. Accordingly, the first lock rod 10 engaged with the first gear 32 is slid to a left side being an opposite direction of the second lock rod 20 in the glove box door 1 so a part of the first lock rod 10 protruding to a right side of the glove box door 1 is inserted into the glove box door 1, thereby releasing the locking of the right side of the glove box door 1.

That is, when the user presses and pushes the button 7, ends of the first lock rod 10 and the second lock rod 20 simultaneously enter the glove box door 1 so that both sides of the glove box door 1, thereby simultaneously opening the both sides of the glove box door 1.

If the user separates the button 7, the ends of the first lock rod 10 and the second lock rod 20 are simultaneously protrude to the both sides of the glove box door 1 by an elastic restoring force. In this state, if the user pulls the glove box door 1, the ends of the first lock rod 10 and the second lock rod 20 make contact with the glove box housing and slightly enter the glove box door 1. If the ends of the first lock rod 10 and the second lock rod 20 is aligned with a hole formed in the glove box housing, the first lock rod 10 and the second lock rod 20 are simultaneously twitted and locked in the glove box housing so that both sides of the glove box door 1 are simultaneously locked.

As described above, in the glove box for an automobile according to the present invention, if the assembly positioning protrusion 23 formed in the second lock rod 20 is inserted into the assembly positioning groove 13 formed in the first lock rod 10, since the assembly position of the first lock rod 10 and the assembly position of the second lock rod 20 are determined, the first lock rod 10 and the second lock rod 20 may be assembled so that lengths of the ends of the first lock rod 10 and the second lock rod 20 protruding to both sides of the glove box door 1 are equal to each other, thereby simultaneously locking the both sides of the glove box door 1 or simultaneously releasing the locking thereof.

In addition, since the first lock rod 10 and the second lock rod 20 are engaged with a gear rotating member 30 to be move rightward and leftward, sliding motion displacements of the first lock rod 10 and the second lock rod 20 are equal to each other to simultaneously lock the both sides of the glove box door 1 or to simultaneously release the locking thereof.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A glove box for an automobile, comprising:
   a glove box body hinged on an instrument panel having an opening, the glove box including:
      a glove box door which is positionable to open and close the opening of the instrument panel, and
      a receptacle fixed at a rear of the glove box door so as to be inserted into or withdrawn from the opening as the glove box door is positioned to close or open the opening;
   a first lock rod located in the glove box door and including a first end protruding from a first side of the glove box door so as to lock the first side of the glove box door to the instrument panel when the glove box door is positioned to close the opening and to unlock the first side of the glove box door from the instrument panel, allowing the glove box door to be positioned to open the opening; and
   a second lock rod located in the glove box door and including first end protruding from a second side of the glove box door opposite to the first side so as to lock the second side of the glove box door to the instrument panel when the glove box door is positioned to close the opening and to unlock the second side of the glove box door from the instrument panel, allowing the glove box door to be positioned to open the opening,
   wherein an assembly positioning groove is formed in the first lock rod, an assembly positioning protrusion is formed on the second lock rod, when the first and second lock rods are assembled to the glove box door, the assembly positioning protrusion is inserted into the assembly positioning groove so that an assembly position of the first lock rod and an assembly position of the second lock rod are determined, and
   wherein the assembly positioning protrusion is located outside the assembly positioning groove so as to not face the assembly positioning groove when the first and second lock rods are operated to move away from their respective assembly positions such that their respective first ends protrude from the first and second sides of the glove box door, respectively.

2. The glove box of claim 1, wherein in the assembly positions of the first and second lock rods, a length of the first end of the first lock rod protruding toward the first side of the glove box door is equal to a length of the first end of the second lock rod protruding toward the second side of the glove box door.

3. The glove box of claim 1, further comprising a stopper which limits motion of the first lock rod when the assembly positioning protrusion is inserted into the assembly positioning groove.

4. The glove box of claim 3, wherein the first lock rod has a second end opposite to the first end, and wherein a projection, having a vertical width smaller than a vertical width of the second end of the first lock rod, is formed on the second end of the first lock rod,
   wherein the stopper comprises:
      a first insertion portion in which the projection is inserted;
      a second insertion portion having a vertical width greater than that of the first insertion portion and in which the second end of the first lock rod is inserted; and
      a protrusion which vertically connects the first insertion portion to the second insertion portion to limit motion of the first lock rod inserted into the second insertion portion.

5. The glove box of claim 4, wherein the stopper further comprises a locking portion which vertically connects to an end of the first insertion portion,
   the projection comprises a hook protrusion locked with the locking portion so as to limit the motion of the first lock rod.

6. The glove box of claim 1, further comprising a rotating member provided in the glove box door to slide the first lock rod and the second lock rod in opposite directions so as to lock and unlock the first and second sides of the glove box door to the instrument panel.

7. The glove box of claim 6, wherein the rotating member comprises:
a first gear engaged with the first lock rod; and
a second gear axially connected to the first gear and engaged with the second lock rod.

8. The glove box of claim 7, wherein a diameter of the first gear is different from a diameter of the second gear.

9. The glove box of claim 6, further comprising a support plate coupled to the glove box door, wherein the rotating member is rotatably provided to the support plate,
wherein the first lock rod and the second lock rod are slidably disposed on the support plate for rightward and leftward sliding motion, respectively, and wherein the rotating member is disposed between the first lock rod and the second lock rod.

10. The glove box of claim 9, wherein each of the first lock rod and the second lock rod comprises an inner side portion engaged with the rotating member and an outer side portion, each inner side portion and outer side portion are spaced apart from each other in forward and rearward directions.

11. The glove box of claim 10, further comprising at least one guide part that is formed on the support plate and is inserted between the inner side portion and the outer side portion of each of the first and second lock rods so as to guide the rightward and leftward sliding motion of the first lock rod and the second lock rod, respectively.

12. The glove box of claim 11, wherein the at least one guide part comprises a plurality of guide parts that are spaced apart from each other in rightward and leftward directions.

13. The glove box of claim 11, wherein the at least one guide part comprises a plurality of upper guide parts inserted into an upper side of the first lock rod, a plurality of upper guide parts inserted into an upper side of the second lock rod, a plurality of lower guide parts inserted into a lower side of the first lock rod, and a plurality of lower guide parts inserted into a lower side of the second lock rod.

14. The glove box of claim 13, wherein each of the first and second lock rods includes a plurality of upper guide part insertion grooves and a plurality of lower guide part insertion grooves formed therein, wherein during assembly of the first and second rods onto the support plate, the upper guide parts of the first and second lock rods are inserted into the respective upper guide part insertion grooves and the lower guide parts of the first and second lock rods are inserted into the respective lower guide part grooves such that the upper guide parts and the lower guide parts are disposed between the inner side portion and the outer side portion of the first and second lock rods, respectively, and such that the first and second lock rods are movable into their respective assembly positions.

15. The glove box of claim 14, wherein the upper guide parts and the lower guide parts are formed on the support plate.

* * * * *